US006611898B1

(12) United States Patent
Slattery et al.

(10) Patent No.: US 6,611,898 B1
(45) Date of Patent: Aug. 26, 2003

(54) OBJECT-ORIENTED CACHE MANAGEMENT SYSTEM AND METHOD

(75) Inventors: Doug Slattery, Batavia, OH (US); Jason Jump, Covington, KY (US)

(73) Assignee: Convergys Customer Management Group, Inc., Cincinnati, OH (US)

(*) Notice: Subject to any disclaimer, the term of this patent is extended or adjusted under 35 U.S.C. 154(b) by 161 days.

(21) Appl. No.: 09/841,890

(22) Filed: Apr. 25, 2001

Related U.S. Application Data

(63) Continuation-in-part of application No. 09/745,300, filed on Dec. 22, 2000.

(51) Int. Cl.[7] .............................................. G06F 17/30
(52) U.S. Cl. ...................... 711/118; 707/1; 707/103 R; 711/113; 711/119; 711/120; 711/121; 711/122; 711/123; 717/108; 717/140; 717/165
(58) Field of Search ........................... 707/1, 6, 103 R; 717/108, 140, 165; 711/118, 113, 123

(56) References Cited

U.S. PATENT DOCUMENTS

| | | | | |
|---|---|---|---|---|
| 4,410,944 A | | 10/1983 | Kronies ....................... 364/200 |
| 5,261,051 A | | 11/1993 | Masden et al. ............. 395/200 |
| 5,313,629 A | * | 5/1994 | Abraham et al. ........ 707/103 R |
| 5,315,709 A | * | 5/1994 | Alston et al. ................... 707/6 |
| 5,452,447 A | | 9/1995 | Nelson et al. .............. 395/650 |
| 5,499,371 A | * | 3/1996 | Henninger et al. ......... 717/108 |
| 5,526,519 A | | 6/1996 | Maruyama et al. ......... 395/600 |
| 5,530,853 A | * | 6/1996 | Schell et al. ................... 707/1 |
| 5,615,362 A | * | 3/1997 | Jensen et al. ........... 707/103 R |
| 5,706,506 A | * | 1/1998 | Jensen et al. ........... 707/103 R |
| 5,765,174 A | | 6/1998 | Bishop ....................... 707/206 |
| 5,835,908 A | | 11/1998 | Bennett et al. ................ 707/10 |
| 5,835,943 A | | 11/1998 | Yohe et al. .................. 711/118 |
| 5,872,969 A | | 2/1999 | Copeland et al. ........... 395/671 |
| 5,933,849 A | | 8/1999 | Srbljic et al. ............... 711/118 |
| 5,940,827 A | | 8/1999 | Hapner et al. ................. 707/8 |
| 6,012,085 A | | 1/2000 | Yohe et al. .................. 709/217 |
| 6,016,495 A | | 1/2000 | McKeehan et al. ......... 707/103 |
| 6,021,470 A | | 2/2000 | Frank et al. ................. 711/138 |
| 6,047,284 A | | 4/2000 | Owens et al. .................. 707/4 |
| 6,064,406 A | | 5/2000 | Atkinson et al. ............ 345/515 |
| 6,070,165 A | | 5/2000 | Whitmore ................... 707/101 |
| 6,081,802 A | | 6/2000 | Atherton et al. ............... 707/3 |
| 6,092,075 A | | 7/2000 | Carey et al. ................ 707/102 |
| 6,098,074 A | | 8/2000 | Cannon et al. ............. 707/200 |
| 6,105,066 A | | 8/2000 | Hayes, Jr. ................... 709/226 |
| 6,106,569 A | | 8/2000 | Bohrer et al. .................. 717/1 |

* cited by examiner

*Primary Examiner*—T. V. Nguyen
(74) *Attorney, Agent, or Firm*—Frost Brown Todd LLC

(57) ABSTRACT

The present invention is directed toward a system and method for caching data for multiple processes. The system utilizes a data storage device, and has at least one process adapted to utilize data stored in that data storage device. A component is used, which includes a basic set of instructions for creating and utilizing a memory map file in the data storage device. The memory map file stores data used by the process. A caching object is then built with the component. The caching object generates and manages the caching of data for the process in the memory map file. Also included in the present invention is a method for adding data caching ability to a process.

20 Claims, 2 Drawing Sheets

OBJECT-ORIENTED CACHE MANAGEMENT SYSTEM AND METHOD

This application is a continuation-in-part application under 37 CFR 1.53(b) of application Ser. No. 09/745,300, filed Dec. 22, 2000, which is incorporated herein by reference.

BACKGROUND AND SUMMARY OF THE INVENTION

The present invention relates generally to data caching. Specifically, this invention relates to an object-oriented component allowing quick cache creation for multiple processes.

In an effort to support the business need for near real-time capability, efficient access to data has become a necessity. Applications, such as real-time rating for cell phones, call routing, and billing, typically require efficient cache management. For example, two or more processes may require access to the same database. Each database hit is slow, and the data to be transmitted then typically has to be compressed, sent, then uncompressed before use by a process. Also, applications may wish to retain results from time-intensive calculations instead of having to redo the calculations. Based on the fact that determination response times are unacceptable, it is necessary to cache data. With the demand for cached data increasing, it is necessary to develop a means where development time for creation of a new cache is minimal.

Building a cache from scratch typically takes approximately 300 man-hours. The initial development process has to include the ability to handle many forms of data, from varying data types to varying field and record lengths. Code has to be written to manage data, recognize data, manage a memory map file, and correctly place data into and retrieve data from the memory map file. Code also has to be written to manage the size and location of the memory map file, manage the fact that there are no real pointers, but relative offsets, and prevent separate processes from writing to the same bit at the same time.

It is therefore an object of the present invention to develop a system and method for quickly creating and managing data caches for multiple system processes.

The present invention comprises a system for cache management for multiple processes. The system utilizes a data storage device, and has at least one process adapted to utilize data stored in that data storage device. A component is used, which includes a basic set of instructions for creating and utilizing a memory map file in the data storage device. The memory map file stores data used by the process. A caching object is then built with the component. The caching object generates and manages the caching of data for the process in the memory map file.

Also included in the present invention is a method for adding data caching ability to a process. First, a caching component is generated that includes a basic set of instructions for creating and utilizing a memory map file for data storage. This component is used to generate a process-specific object, adapted to allow a process to use the memory map file for caching. The process-specific object is then added to the process, and the object and process are compiled.

In addition to the novel features and advantages mentioned above, other objects and advantages of the present invention would be readily apparent from the following descriptions of the drawings and example embodiments.

DETAILED DESCRIPTION OF EXAMPLE EMBODIMENT(S)

The present invention is directed toward a system and method for caching data for multiple processes using an object-oriented component, specifically for applications in industries such as the telecommunications industry. Applications that may use the Object Store of the present invention include, but are not limited to, real-time rating for cell phones, call routing, and customer billing. Other applications include: providing account information based upon caller ID, calculating cost of a call using given algorithms, and routing to multiple processes and/or multiple servers.

An example embodiment of the present invention involves a flexible, object-oriented component capable of handling multiple object types. This component has the ability to maintain a single cache instance or multiple cache instances within a single memory mapped flat file. The present invention may comprise a component containing a generic base of coding that simply needs to be customized for a specific application, cutting the 300 hours of time typically needed to create a cache down to about 20 hours. This object-oriented approach provides a significant processing advantage over other methods, such as SQL-based cache creation. In an example embodiment, all that is needed to provide caching for a process using the component is to add the appropriate semantic meaning of the data stored and add an appropriate data dictionary.

Figure 1:
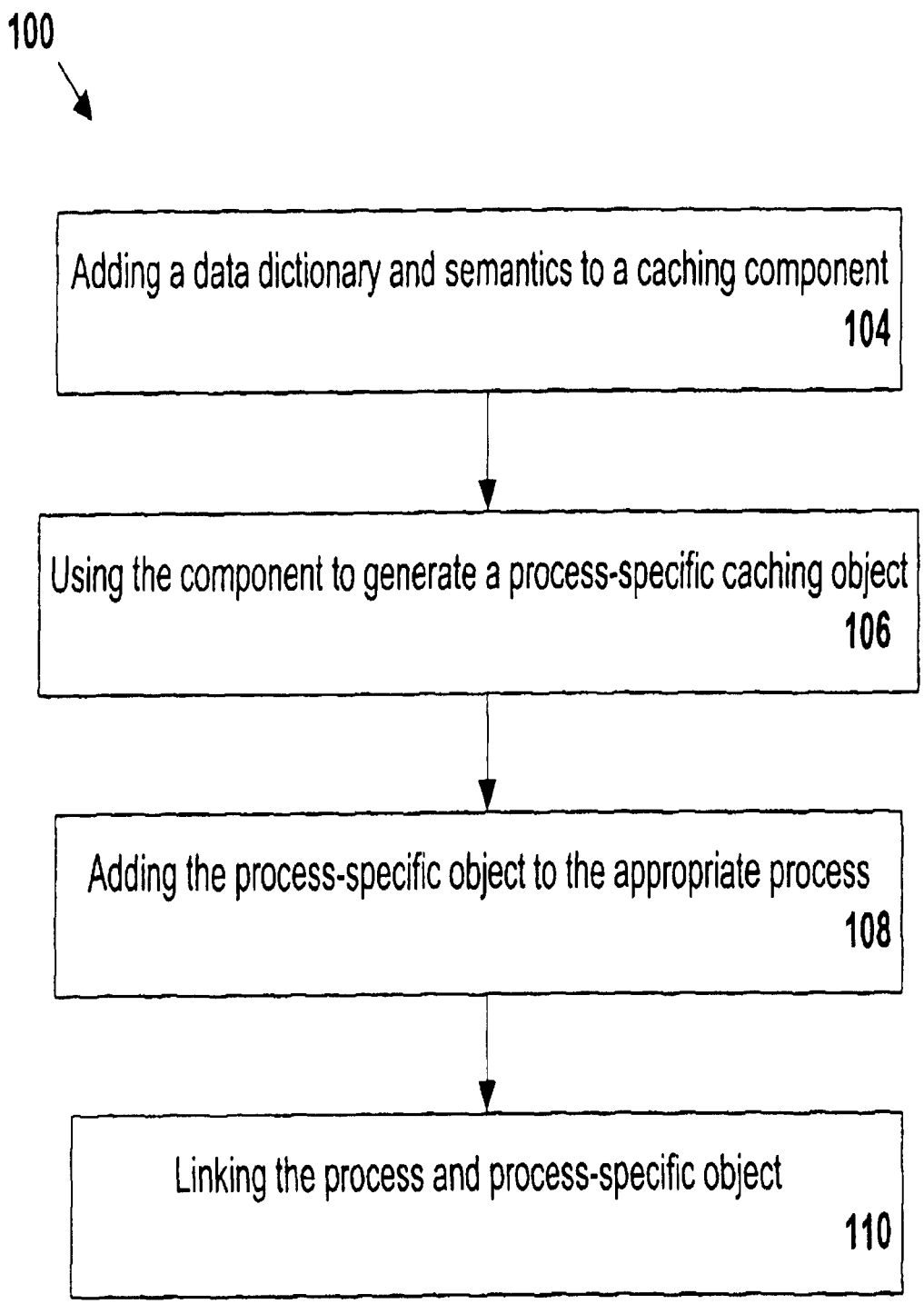
FIG. 1 is a flowchart showing method steps in accordance with one embodiment of the present invention.

FIG. 1 shows the basic steps of an example method 100 of adding data caching ability to a process. First, a data dictionary and semantics are added to a caching component 104. The component is then used to generate a process-specific caching object 106. This process-specific object is added to the appropriate process 108. The process and process-specific object are then compiled 110 into a complete application.

One advantage of the present invention is the approach to inter-process communication. A component of the present invention allows a process to refer to cached data in true object fashion, including data cached by a separate process. Using this approach, when two processes communicate using data objects, they do not need to know the format of the data, where the data is stored, why the data is in the cache, or even that the other process exists. The object-oriented approach allows a caching "object" to be dropped into the process that will handle all of these aspects automatically through the component. The loading of data objects into a memory map file provides the object with persistence, which is another significant advantage over previous approaches.

Caches of the present invention may reside within a memory-mapped file. This file may use a Shared Storage class for file creation and access. A single global object may be used to manage a given memory mapped file, for example, an Object Store (OSobjStore). The Object Store may be initially allocated as a large free space area, which is then allocated as objects are checked into the Object Store. These objects may point to, or contain, other objects that are owned by the same Object Store. All objects placed into the Object Store are may be a subclass of the OSstoreable class (itself a subclass of the RogueWave RWCollectable class), which may be further broken into OScontainer and OSdata classes. By taking advantage of the use of inheritance, all the benefits of a well-defined API are included, allowing anyone to take advantage of its functionality, without requiring internal changes to accommodate different implementations.

Below is a general overview of example base classes involved in an Object Store of the present invention.

OSrootStore. This example class manages access to the memory-mapped file by mapping its contents in the address space of a process. This class inherits from the SharedStorage class (which uses UNIX fcntl( ) utilities for file access).

OSobjStore. This example class inherits from the OSrootStore class and is used to handle memory map file access, locking schemes, and free space utilities. The free space utilities are used to allocate space for an object, and to provide garbage collection. When an object is to be put into the Object Store, this class provides the storage space for the object. There is typically one instance of this class per process per file. This file also manages the entry point into the Object Store. The entry point is a container classified as the core container. This class is a subclass of the SharedStorage class, using memory-mapped files shared across multiple processes.

OSstoreable. This example class may be subclassed by any object wishing to be stored within the Object Store (i.e., by consumers of the class). This class is may be a subclass of the RougeWave RWCollectable class. It contains information pertaining to the data structure and manages the address space of each object that can be placed in the Object Store.

OScontainer. This example class is a superclass of the container object type. It inherits from OSstoreable. This class contains general methods that apply to all container objects (i.e., OShash, OSarray, OSdict, and OSgroup).

OSdata. This example class is a superclass of the data object type. It inherits from OSstoreable. This class contains general methods that apply to all data objects.

OShash. This example class inherits from OScontainer. This class may index objects based on a derived hash value. This hash value is then used to store and retrieve objects from the OSobjStore in a timely manner. OShash uses the OSbucket and OSarray classes to assist with storage/retrieval of objects.

OSbucket. This example class handles the relationship between OShash and OSarray. This class handles maintenance of buckets relative to a given OShash. It is a subclass of OSstoreable.

OSarray. This example class is used to store an array of offsets pointing to objects located within the Object Store. This class is a subclass of OScontainer. The objects in an OSarray could be data or container objects.

To allow for garbage collection, which further enhances the capability of the Object Store component, it may be necessary to have a way to manage free space. Utilities may exist within the Object Store class that act as a free space manager. These utilities may be responsible for reclaiming memory from deleted objects in the Object Store and allocating this space, as needed, for storage of new objects. Upon removal or resizing of objects from the Object Store, the free space manager may catalog the freed space for future use. The. Free Space manager may use an OSarray to assist with free space management.

The Object Store source code may use several classes, such as C++ classes, each declared in its own ClassName.h file and implemented. The OSobjStore class may manage the memory mapped (mmap) file by mapping its contents in the address space of a process. This class may manage the entire address space mapped in for a given mmap file, including providing free space utilities. The free space utilities may be used to allocate space for an object and may provide garbage collection. When an object is to be put into the Object Store, this class may provide the storage space necessary for that object. There may be one instance of this class per process per file. This Object Store may also manage the entry point into the memory map file. The entry point is a container classified as the core container. Each Object Store has one core container. The core container may be changed to a different container at any time.

OSstoreable may be a SuperClass containing methods for managing data. It contains information pertaining to the data structure, and manages the address space of, each object that can be placed into an Object Store. This class may be subclassed by consumers of the cache. The process for updating shared data may consist of updating each attribute of the object by calling the mutator of that attribute. Alternatively, the process may check objects out of the Object Store, update them, then check those objects back in. In an example embodiment, one process may check out a given object at a given time. Once the object is checked in, all processes attached to the Object Store receive any changes made to that object.

An object may have one of three states: temporary, persistent, or local. In the temporary state, the object handles local data, with no shared component (never checked in). In the persistent state, the object handles on a shared component but no local data. In the local state, the object handles both local data and a shared component (checked out).

OScontainer may be a SuperClass for container objects. This class may be subclassed by each type of container object (i.e., OShash, OSarray). This class may contain methods that are applicable to all container types.

Figure 2:
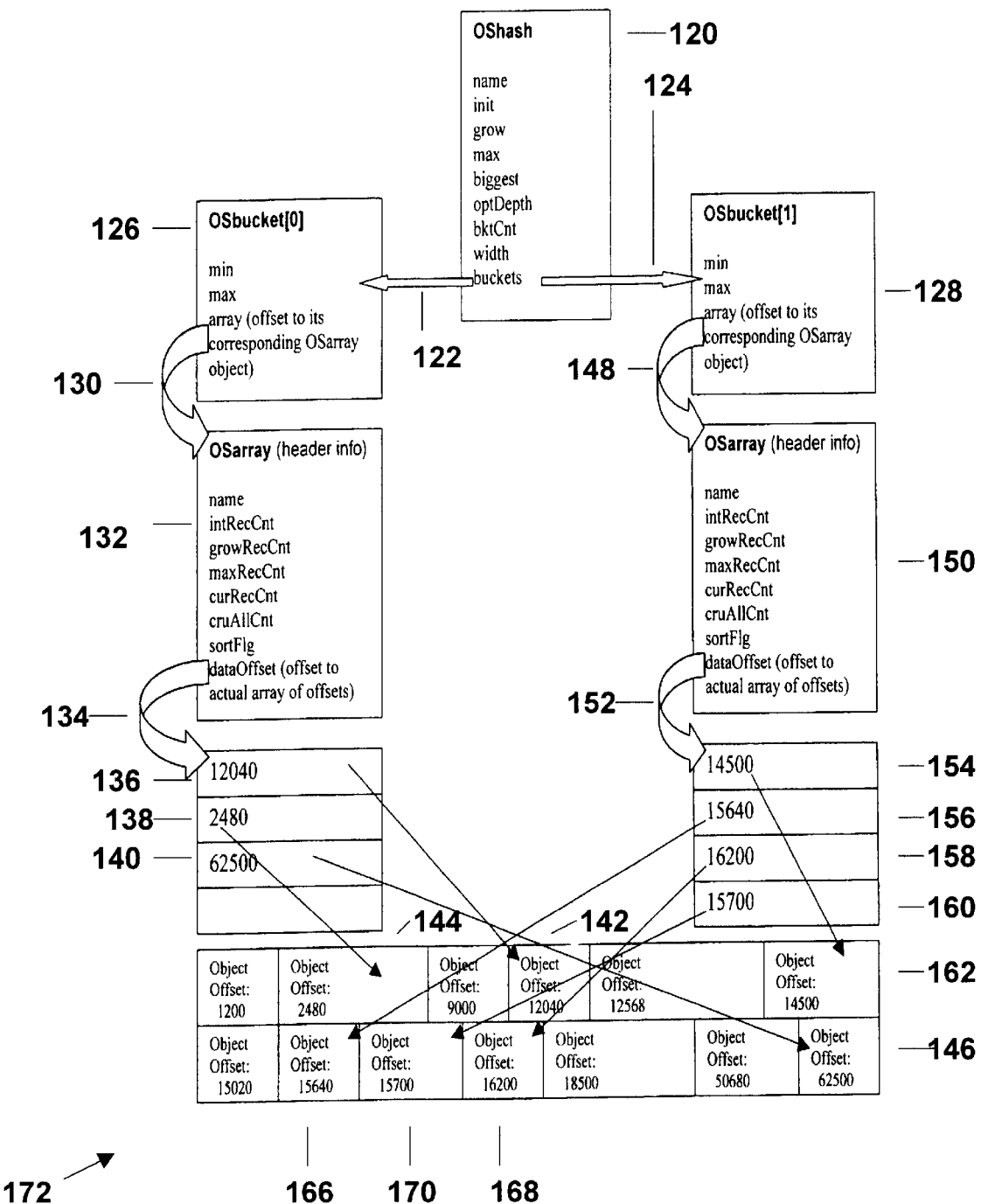
FIG. 2 is a diagram illustrating a hashing technique for managing an Object Store in accordance with an example embodiment of the present invention.

Referring to FIG. 2, a diagram illustrating a hashing technique for managing the Object Store in accordance with an example embodiment of the present invention is shown. An OShash class 120 may contain the knowledge of a hash value or index. Objects may be added to an instance of OShash to allow for efficient retrieval of those objects. Multiple OShash instances may be allowed for a single cache object. The hash value for all hashes may be of type "unsigned short." An OShash object has bucket values 122, 124 that reference one or more bucket objects (e.g., OSbucket[0] 126 and OSbucket[1] 128). Each time an object is added to the hash, the object's hash value may be used to determine the bucket to which the object should be added. When retrieving an object, its hash value is first obtained. With the hash value, the appropriate bucket to search is determined, and a binary search may be used to find the correct object. Each bucket in a hash has a minimum hash value allocated to the bucket, maximum hash value allocated to the bucket, object count, and a corresponding array object that contains an offset value to an actual array of offsets to objects. Each of the offsets in the array determines the location of an actual object. The buckets owned by a hash encompass the entire possible hash range without overlaps, and are dynamically leveled or balanced as necessary to deter any one bucket from becoming too large.

Referring to FIG. 2, for example, OSbucket[0] 126 has an "array" value 130 that is an offset to a corresponding OSarray object 132. The OSarray object 132 has a "dataOffset" value 134 which is an offset to an actual array of offsets for objects. Each value in the array contains an object offset value which is the location of the actual object. For example, in the first array location 136, the value 12040 136 is the object offset value for the object at location 12040 142 in the Object Store 172. In the second array location 138, the value 2480 138 is the object offset value for the object at location 2480 144 in the Object Store 172, and in the third array location 140, the value 62500 140 is the object offset value for the object at location 62500 146 in the Object Store 172. Similarly, for example, OSbucket[1] 128 has an "array" value 148 that is an offset to a corresponding OSarray object 150. The OSarray object 150 has a "dataOffset" value 152 to an actual array of offsets for objects. In the first array location 154, the value 14500 154 is the object offset value for the object at location 14500 162 in the Object Store 172. In the second array location 156, the value 15640 156 is the object offset value for the object at location 15640 166 in the Object Store 172. In the third array location 158, the value 16200 158 is the object offset value for the object at location 16200 168 in the Object Store 172, and in the fourth array location 160, the value 15700 160 is the object offset value for the object at location 15700 170 in the Object Store 172.

An OSupdater program may be used to update an Object Store whenever data stored in the Object Store has been changed based on external events, such as changes in the database. The OSupdater may be used to keep the database and Object Store in sync. An OSupdater process may handle business events for a given set of Object Store files, which may be identified via the command line. The Object Store(s) that are updated via a given OSupdater process are then sent as an Acknowledger list, in order to retrieve the list of business events specific to those Object Stores. Each Object Store also may have the ability to request loading of objects referenced by an event, where those objects do not already exist in the Object Store.

Oracle or other appropriate database changes caused by these events are expected to be included in the memory mapped Object Store within a short time (approximately 5 minutes) after the event occurs. Any calls using the Object Store data during this update delay period may be processed based upon the old data.

The Object Store may be created dynamically on the first attach() attempt. If the Object Store supplied in the attach (os, domain) method does not exist, the memory mapped file may be created by Shared Storage. The Object Store is initially one large area of free space. This free space may then be allocated for objects as needed. If an object to be stored requires more space than is available, the mmap file may be increased in size appropriately. Upon subsequent access to an mmap file after growth, a process using that file remaps the newly resized mmap file into its address space. Once an Object Store grows, an internal version number is incremented as a means to notify all attached processes of the file growth. When a process attempts use of the Object Store, if the version of the Object Store it currently has mapped does not match the version number stored in the mmap file, it unattaches and remaps the memory mapped file into its address space, accounting for the change in file size.

Even though an example Object Store allows for garbage collection, it may still be possible for an Object Store to become too large to be placed in an individual file. In this case, a new file may need to be created. All processes attached to the current file may then remap to use the new file. An Object Store may also get corrupted, such that it would have to be replaced. The same procedure for creating a full Object Store may be used for this purpose.

There may be several operational considerations to be taken into account when implementing an Object Store. Customer information or other critical business data may be stored in an Object Store of the present invention. An Object Store memory mapped file may be visible as an ordinary UNIX file, with data access controlled by standard file and directory permission settings. Standard file, or other appropriate security procedures may be followed. Also, locking of an object may be required for adding or updating of that object. This may be handled via a SharedStorage class, which may utilize the UNIX fcntl utility. It is also expected that initial access of a data store may be slow until the Object Store is sufficiently "warmed."

The Object Store memory-mapped files may live in a directory that is local to the CPU, not on an NFS-mounted or remote file system. With NFS files, the changes posted to the files may not be immediately visible to other processes. Also, the network transmission time may significantly reduce an Object Store's performance. The files may also frequently be locked and unlocked. The use of an Object Store for multiple billing rating and usage systems may be possible if each system has a local copy of the memory mapped files and each copy is inserted/updated by the processes of that system.

The example embodiments herein disclosed are not intended to be exhaustive or to unnecessarily limit the scope of the invention. The example embodiments were chosen and described in order to explain the principles of the present invention so that others skilled in the art may practice the invention. Having shown and described example embodiments of the present invention, those skilled in the art will realize that many variations and modifications may be made to affect the described invention. Many of those variations and modifications will provide the same result and fall within the spirit of the claimed invention. It is the intention, therefore, to limit the invention only as indicated by the scope of the claims.

What is claimed is:

1. A system for cache management for multiple processes, said system comprising:
   (a) a data storage device;
   (b) a process adapted to utilize data stored in said data storage device;
   (c) a component, said component comprising a basic set of instructions for creating and utilizing a memory map file in said data storage device, said memory map file adapted to store data used by said process; and
   (d) a caching object built on said component, said caching object adapted to generate and manage the caching of data for said process in said memory map file.

2. A system according to claim 1 wherein said caching object is adapted to maintain multiple cache instances in said memory map file.

3. A system according to claim 1 wherein said process has a virtual address space mapped to said memory map file by said caching object.

4. A system according to claim 1 additionally comprising a free space manager adapted to allow for collection of garbage data.

5. A system according to claim 1 wherein said component comprises a data dictionary and semantics.

6. A system according to claim 1 wherein said component is adapted to generate said caching object.

7. A method for adding data caching ability to a process, said method comprising the steps of:
   (a) generating a caching component, said component comprising a basic set of instructions for creating and utilizing a memory map file for data storage;

(b) using said component to generate a process-specific object, said process-specific object adapted to allow a process to use said memory map file for caching;

(c) adding said process-specific object to said process; and (d) compiling said process and said process-specific object into an application.

8. A method according to claim 7 additionally comprising the step of adding semantics appropriate to said process to said caching component in order to generate said process-specific object.

9. A method according to claim 7 additionally comprising the step of adding a data dictionary appropriate to said process to said caching component in order to generate said process-specific object.

10. A method according to claim 7 wherein said application is selected from the group consisting of real-time rating, call routing, customer billing, caller ID accounting, cost calculating, and process routing applications.

11. A method for caching data, said method comprising the steps of:

(a) generating a process-specific object from a caching component, said caching component comprising a basic set of instructions for creating and utilizing a memory map file for data storage, said process-specific object adapted to allow a process to use said memory map file for caching;

(b) adding said process-specific object to said process, said process requiring the use of a memory cache; and (c) managing data storage and retrieval from said memory map file for said process using said process-specific object.

12. A method according to claim 11 additionally comprising the step of mapping a virtual space of said process to said memory map file.

13. A method according to claim 11 additionally comprising the step of generating a free space manager adapted to allow for collection of garbage data.

14. A method according to claim 11 wherein said caching component comprises a data dictionary and semantics.

15. A system for cache management comprising:

(a) a root object adapted to map file contents to a process address space to create a memory mapped file;

(b) a store object adapted to manage access to said memory mapped file;

(c) a storeable object stored in said memory mapped file, said storeable object adapted to manage the address space of said store object;

(d) a core container object comprising at least one hash object, said hash object comprising a bucket object, said bucket object comprising an array object, said array object comprising a data offset for an array of offsets; and (e) a stored object in said memory mapped file, said stored object accessible in accordance with said offsets in said array located in accordance with said data offset in said array object, an array offset in said bucket object, and a hash value in said hash object.

16. The system of claim 15 further comprising a version number for said store object.

17. The system of claim 15 wherein said store object is adapted to request loading of said stored object in accordance with an event.

18. The system of claim 15 wherein said store object is updated in accordance with external events.

19. The system of claim 18 wherein said external events are business events.

20. The system of claim 15 wherein stored object is adapted to hold data for applications selected from the group consisting of real-time rating, call routing, customer billing, caller ID accounting, cost calculating, and process routing applications.

* * * * *

UNITED STATES PATENT AND TRADEMARK OFFICE
CERTIFICATE OF CORRECTION

PATENT NO. : 6,611,898 B1  Page 1 of 1
DATED : August 26, 2003
INVENTOR(S) : Doug Slattery and Jason Jump It is certified that error appears in the above-identified patent and that said Letters Patent is hereby corrected as shown below:

<u>Column 3,</u>
Line 1, "are" is deleted.
Line 30, "is" is deleted.

Signed and Sealed this

Third Day of February, 2004

JON W. DUDAS
*Acting Director of the United States Patent and Trademark Office*